United States Patent
DeCusatis et al.

(10) Patent No.: US 9,686,203 B2
(45) Date of Patent: *Jun. 20, 2017

(54) FLOW CONTROL CREDITS FOR PRIORITY IN LOSSLESS ETHERNET

(71) Applicant: International Business Machines Corporation, Armonk, NY (US)

(72) Inventors: Casimer M. DeCusatis, Poughkeepsie, NY (US); Mircea Gusat, Langnau (CH); Keshav G. Kamble, Fremont, CA (US); Cyriel J. Minkenberg, Gutenswil (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/846,690

(22) Filed: Sep. 4, 2015

(65) Prior Publication Data

US 2015/0381510 A1 Dec. 31, 2015

Related U.S. Application Data

(63) Continuation of application No. 13/863,287, filed on Apr. 15, 2013, now Pat. No. 9,160,678.

(51) Int. Cl.
*H04L 12/801* (2013.01)
*H04L 12/851* (2013.01)
*H04W 84/12* (2009.01)

(52) U.S. Cl.
CPC ............ *H04L 47/39* (2013.01); *H04L 47/24* (2013.01); *H04W 84/12* (2013.01)

(58) Field of Classification Search
None
See application file for complete search history.

(56) References Cited

U.S. PATENT DOCUMENTS 6,347,337 B1 2/2002 Shah et al.
6,990,531 B2 1/2006 Vange
(Continued)

FOREIGN PATENT DOCUMENTS

CN 1851652 A 10/2006
CN 101040471 A 9/2007
(Continued)

OTHER PUBLICATIONS

Berry et al., "PPP Over Ethernet (PPPoE) Extensions for Credit Flow and Link Metrics (RFC4938)," Internet Society, Jun. 1, 2007, p. 1-17.
(Continued)

*Primary Examiner* — Eunsook Choi
(74) *Attorney, Agent, or Firm* — Zilka-Kotab, P.C.

(57) ABSTRACT

In one embodiment, a system includes a hardware processor and logic integrated with and/or executable by the processor. The logic is configured to classify a traffic flow into a traffic class based on at least one criteria related to the traffic flow and request that a credit manager remap flow credits corresponding to a first traffic class to flow credits corresponding to a second traffic class. In another embodiment, a method for providing credit-based flow control includes classifying a traffic flow into a traffic class based on at least one criteria related to the traffic flow, the traffic class being selected from a plurality of traffic classes. The method also includes storing an identifier indicating the traffic class of packets of the traffic flow according to a virtual local area network (VLAN) identifier in a three bit VLAN tag portion of a header of one or more of the packets.

20 Claims, 6 Drawing Sheets

(56) References Cited

U.S. PATENT DOCUMENTS

| | | |
|---|---|---|
| 7,042,842 B2 | 5/2006 | Paul et al. |
| 7,170,905 B1 | 1/2007 | Baum et al. |
| 7,391,728 B2 | 6/2008 | Natarajan et al. |
| 7,525,978 B1* | 4/2009 | Tabatabaee ......... H04L 12/5693 370/411 |
| 7,969,971 B2 | 6/2011 | Gai et al. |
| 8,259,761 B2 | 9/2012 | Diab et al. |
| 8,392,571 B2 | 3/2013 | Schlansker et al. |
| 8,745,264 B1 | 6/2014 | Marr |
| 9,160,678 B2 | 10/2015 | DeCusatis et al. |
| 2002/0159385 A1 | 10/2002 | Susnow et al. |
| 2003/0223370 A1* | 12/2003 | Jain ........................ H04L 47/10 370/235 |
| 2004/0013088 A1 | 1/2004 | Gregg |
| 2009/0086635 A1 | 4/2009 | DeCusatis et al. |
| 2010/0322263 A1* | 12/2010 | Allan ...................... H04L 45/66 370/403 |
| 2011/0128963 A1* | 6/2011 | Reed .................... H04L 47/527 370/395.1 |
| 2012/0066407 A1* | 3/2012 | Andries ............. H04L 41/5009 709/232 |
| 2013/0016609 A1* | 1/2013 | Hayakawa ........... H04L 69/324 370/230 |
| 2013/0254452 A1* | 9/2013 | Ajanovic ............. G06F 13/124 710/315 |
| 2014/0003232 A1* | 1/2014 | Guichard ................ H04L 67/16 370/230 |
| 2014/0030755 A1 | 1/2014 | Allender et al. |
| 2014/0169215 A1* | 6/2014 | Rajendran ........... H04L 41/0806 370/254 |
| 2014/0204742 A1* | 7/2014 | Pandit .................. H04L 47/263 370/231 |
| 2014/0237156 A1 | 8/2014 | Regula et al. |
| 2014/0307555 A1 | 10/2014 | DeCusatis et al. |

FOREIGN PATENT DOCUMENTS

| | | |
|---|---|---|
| CN | 101399770 A | 4/2009 |
| EP | 0853405 A2 | 7/1998 |

OTHER PUBLICATIONS

Non-Final Office Action from U.S. Appl. No. 13/863,287, dated Jan. 12, 2015.

Notice of Allowance from U.S. Appl. No. 13/863,287, dated Jun. 9, 2015.

DeCusatis et al., U.S. Appl. No. 13/863,287, filed Apr. 15, 2013.

Office Action from Chinese Patent Application No. 201410150381.1, dated Jan. 25, 2017.

* cited by examiner

FLOW CONTROL CREDITS FOR PRIORITY IN LOSSLESS ETHERNET

BACKGROUND

The present invention relates to data center management and file systems, and more specifically, this invention relates to using flow control credits in assigning priority in lossless Ethernet.

Currently available lossless Ethernet networks do not allow for credit-based flow control where a priority of traffic flows is determined based on an available amount of credit. Instead, conventional lossless Ethernet networks, and more specifically the switches used therein, when an issue or problem arises and a packet is undeliverable, simply discard the packet, and in some instances, retransmit the discarded packets at a later time. This approach adds additional latency to the network when a packet is undeliverable, and may result in some packets being dropped permanently, even in the lossless Ethernet network.

Ethernet is becoming more and more popular in Some conventional switched fabric networks may make use of credit-based flow control, such as InfiniBand and other network protocols, but these credit-based flow control systems are not applicable nor are they capable of being used in Ethernet networks or to utilize existing Ethernet frame formats and protocols.

BRIEF SUMMARY

In one embodiment, a system includes a hardware processor and logic integrated with and/or executable by the processor. The logic is configured to classify a traffic flow into a traffic class based on at least one criteria related to the traffic flow, the traffic class being selected from a plurality of traffic classes. The logic is also configured to request that a credit manager remap flow credits corresponding to a first traffic class to flow credits corresponding to a second traffic class.

According to another embodiment, a computer program product for providing credit-based flow control includes a computer readable storage device having program code embodied therewith. The embodied program code is readable/executable by a processor to remap, using the processor, flow credits corresponding to a first traffic class to flow credits corresponding to a second traffic class in response to receiving a request from a switching device indicating that the second traffic class has insufficient flow credits to transmit a traffic flow.

In another embodiment, a method for providing credit-based flow control includes classifying a traffic flow into a traffic class based on at least one criteria related to the traffic flow, the traffic class being selected from a plurality of traffic classes. The method also includes storing an identifier indicating the traffic class of packets of the traffic flow according to a virtual local area network (VLAN) identifier in a three bit VLAN tag portion of a header of one or more of the packets.

Other aspects and embodiments of the present invention will become apparent from the following detailed description, which, when taken in conjunction with the drawings, illustrate by way of example the principles of the invention.

DETAILED DESCRIPTION

Figure 1:
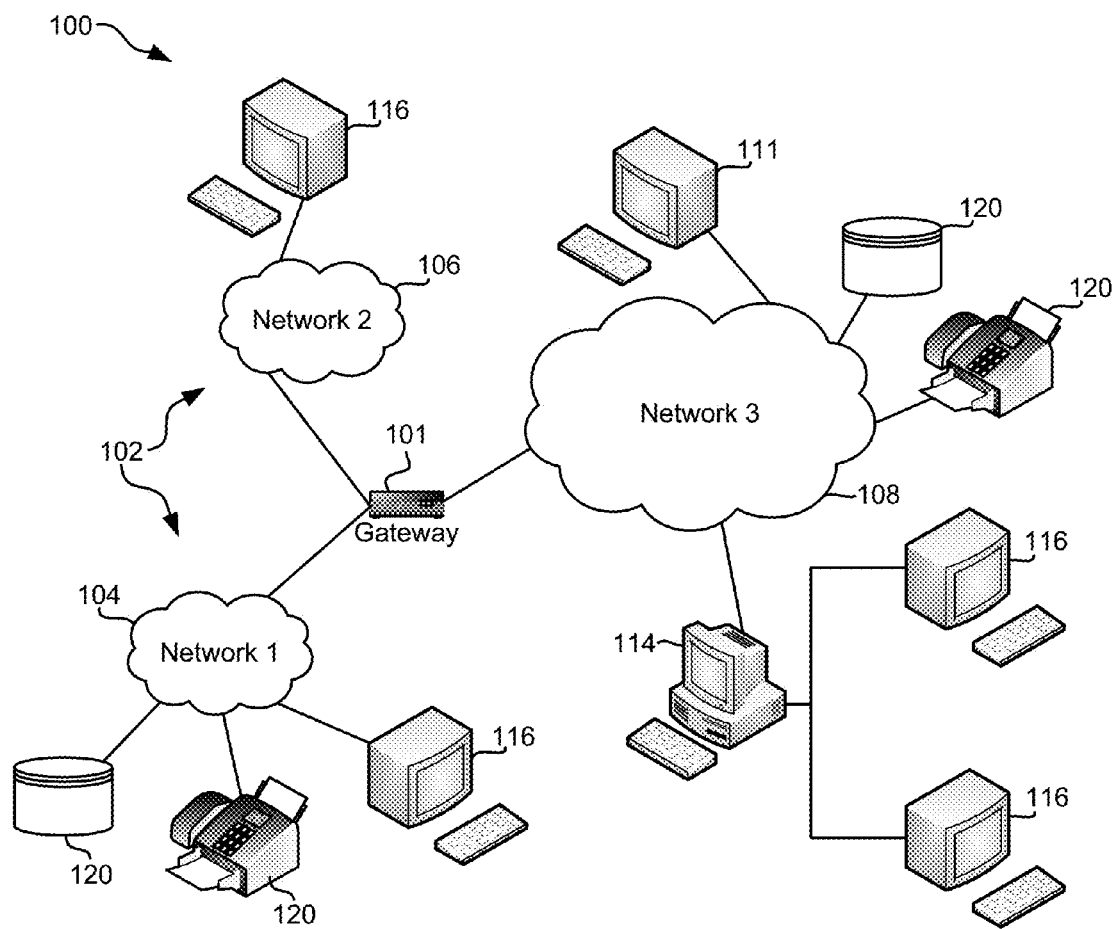
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for implementing credit-based flow control in lossless Ethernet networks. Particularly, a credit-based flow control mechanism allows for the convergence of Ethernet protocols with existing or new InfiniBand, remote direct memory access (RDMA), etc., protocols into a single, common link type, e.g., RDMA over converged Ethernet (RoCE) and/or internet wide area RDMA protocol (iWARP) approaches with lossless Ethernet.

In one general embodiment, a system includes an initiator port adapted to receive a traffic flow having a plurality of packets and a hardware processor and logic integrated with and/or executable by the processor, the logic being adapted to classify the traffic flow into a traffic class based on at least one criteria related to the traffic flow, the traffic class being selected from a plurality of traffic classes and transmit one or more packets of the traffic flow to a target port designated by the one or more packets of the traffic flow until an amount of flow credits allocated to the target port is insufficient to service additional packets.

According to another general embodiment, a computer program product for providing credit-based flow control includes a computer readable storage medium having program code embodied therewith, the program code readable/executable by a processor to receive, using the processor, a traffic flow having a plurality of packets, classify the traffic flow into a traffic class based on at least one criteria related to the traffic flow, the traffic class being selected from a plurality of traffic classes, and transmit one or more packets of the traffic flow to a target port designated by the one or more packets of the traffic flow until an amount of flow credits allocated to the target port is insufficient to service additional packets.

In another general embodiment, a method for providing credit-based flow control includes receiving a traffic flow having a plurality of packets, classifying the traffic flow into a traffic class based on at least one criteria related to the traffic flow, the traffic class being selected from a plurality of traffic classes, and transmitting one or more packets of the traffic flow to a target port designated by the one or more packets of the traffic flow until an amount of flow credits allocated to the target port is insufficient to service additional packets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
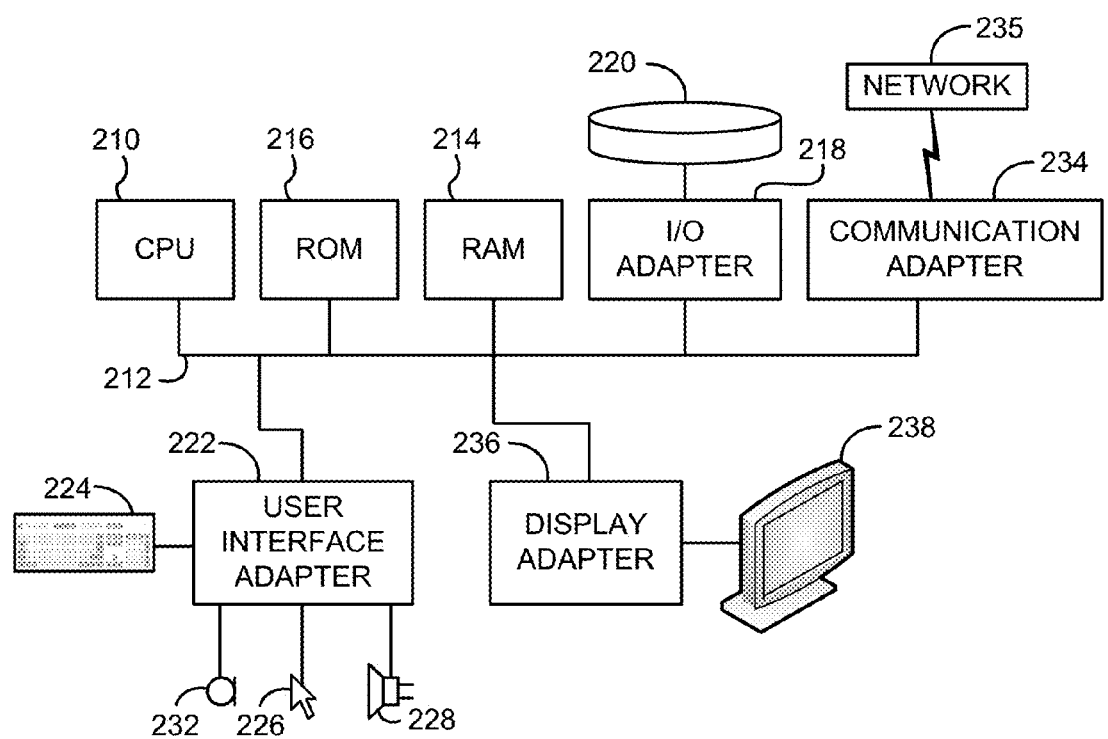
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
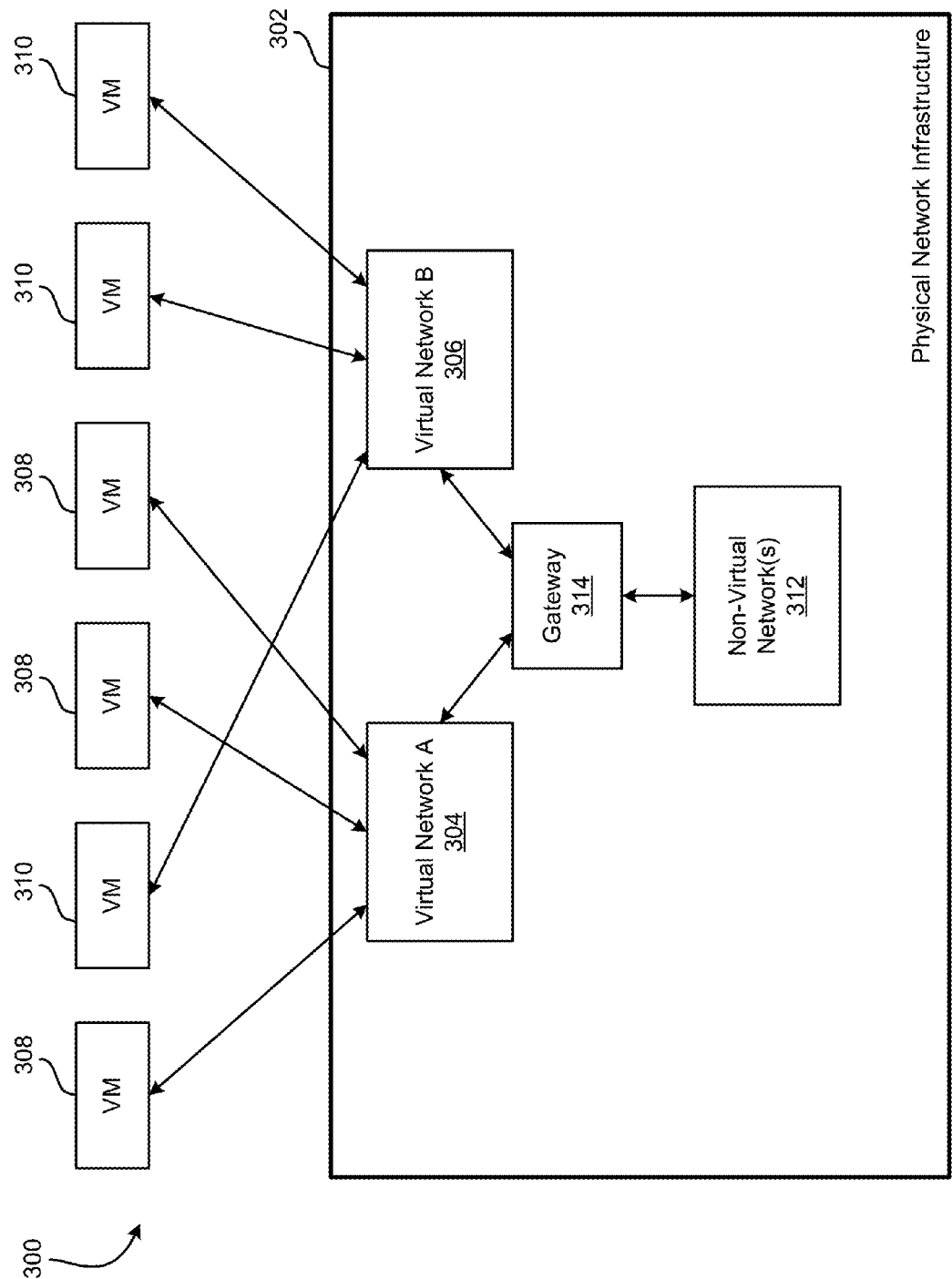
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
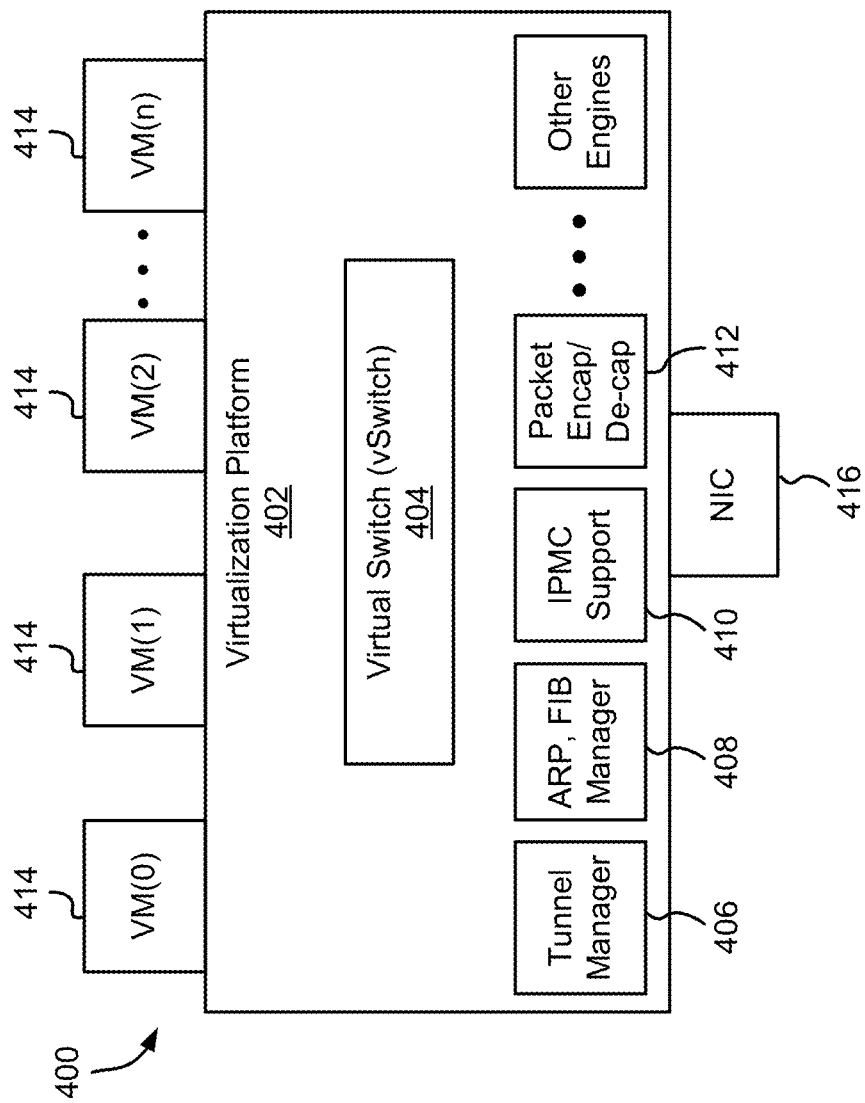
FIG. 4 shows a server, according to one embodiment.

With reference to FIG. 4, a server 400 is shown according to one embodiment. As shown, the server 400 includes a virtualization platform 402 which provides and manages a vSwitch 404.

According to one embodiment, overlay functionality may be provided to the server 400. In order to accomplish this, the virtualization platform 402 may interact with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. In another embodiment, these modules or software engines may be enacted on the NIC 416, or an overlay gateway connected via the NIC 416 to the server 400.

The virtualization platform 402 also provides support for any number of VMs 414, shown in FIG. 4 as VM(0), VM(1), VM(2), . . . , VM(n). The VMs 414 may be arranged in one or more virtual networks (each virtual network may have a different virtual network identifier (VNID), such as VNID 1, VNID 2, VNID 3, etc. The number and arrangement of the VMs 414 in the exemplary virtual networks is not meant to be limiting on what configurations are possible, as the Figures only show exemplary arrangements of VMs 414 and virtual networks.

Figure 5:
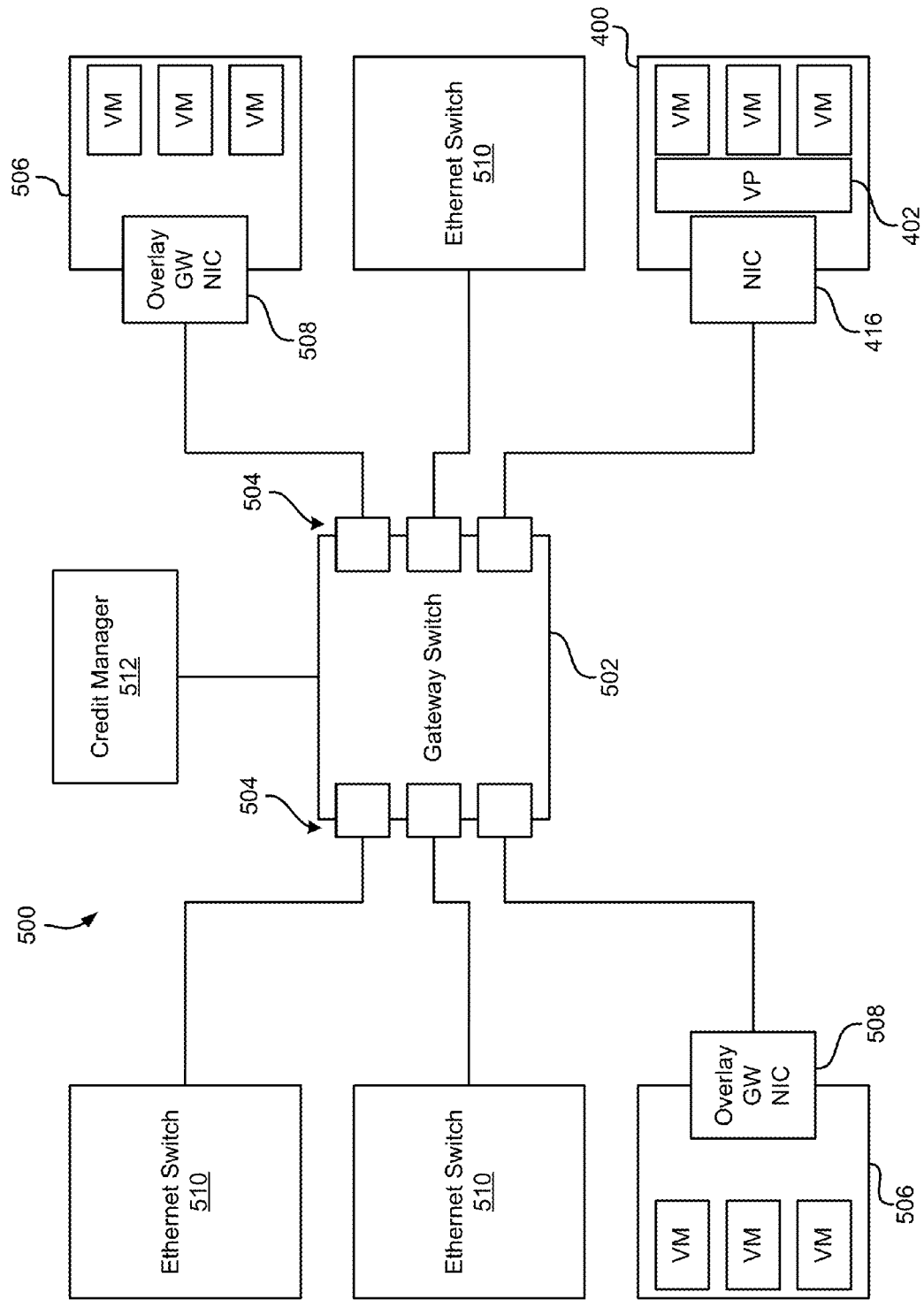
FIG. 5 shows a network, according to one embodiment.

In FIG. 5, a network 500 is shown according to one embodiment. As shown, servers 400 having contemporary NICs 416 and servers 506 having overlay gateway (GW) NICs 508 may be used in the same network 500. One or more Ethernet switches 510 may be included in the network 500, and a gateway switch 502 may be provided which is interconnected and/or accessible to all devices, switches 510, virtual switches, and any other devices in the network 500, according to one embodiment. The gateway switch 502 may be used to interconnect the servers 400, 506 and Ethernet switches 510 or the servers 400, 506 and Ethernet switches 510 may be connected directly to one another. Each Ethernet switch 510 and the gateway switch 502 includes a plurality of ports 504 for connecting thereto. The contemporary NICs 416 may communicate via a virtualization platform (VP) 402 that may provide some overlay functionality, in other embodiments. Furthermore, the network 500 may include a credit manager 512 adapted to distribute flow credits to all ports in the network 500 according to a priority of each individual port.

According to one embodiment, flow control credits may be used to determine which packet from a flow to process in a switching environment, according to various Ethernet traffic priority levels. Flow credits may be exchanged between an endpoint ingress port and an endpoint egress port within a particular network according to one implementation, and not on any intermediate switches therebetween. In other words, an end-to-end credit exchange across the network fabric may be used. Intermediate switches may be unaware of this credit exchange in any meaningful way, they may simply pass along any necessary information to effect the credit exchange process, or they may be involved in the credit exchange more fully, in various embodiments.

Both an initiator (source) system or device and a receiver (target) system or device have a predetermined credit allocation available to use to "pay" for Ethernet flow handling and processing. Each Ethernet flow includes a plurality of packets, and for the sake of clarity, the descriptions provided will refer to a packet or packets, but the concepts, systems, methods, and devices described herein may be used on entire flows or on one or more packets, as would be understood by one of skill in the art upon reading the present descriptions.

The target informs the initiator of how many flow credits it has available to pay for service of one or more packets, and the initiator is adapted to send only a number of packets for which it has already paid for in flow credits, until these allocated flow credits are exhausted and no more processing is able to be paid for. Service in this context may include any operations which are performed on the packets in order to transmit the packets from the initiator to the target, such as switching operations, security operations, status checks, integrity checks, rerouting operations, etc.

The initiator reserves the required number of credits for this transaction prior to asking for the service to be performed on the packets and/or flow. The flow credits are then exchanged when the service is performed. Flow credits are renewed on the initiator upon successful delivery of a packet when the target sends an acknowledgment back to the initiator indicating the successful delivery. There may be multiple initiators communicating with a single target, but each initiator needs to have the requisite flow credits reserved for the requested service, or else the service is not performed.

According to one embodiment, a credit manager distributes flow credits to ports which have available bandwidth for providing service to packets. This credit manager may be a centralized system, device, or software executing on a server or some other system, according to some approaches. In other approaches, the credit manager may be distributed, with capacity to exchange information regarding flow credit exchange and use when needed for seamless interaction between portions of a network which bridge two or more distributed credit managers.

For example, when a centralized credit manager is utilized, an initiator port may request flow credits for transfer of a packet (having a given size) to a desired target port (designated by the packet). If the target port has flow credits available, it provides the required number of flow credits to the initiator port and the packet is sent from the initiator port to the target port for servicing thereof. If the target port does not have a sufficient number of flow credits available to service the packet, the initiator port does not send the packet. Because of this, eventually the initiator port may become congested with unsent packets, and as a result of this congestion, the initiator port may either discard the unsent packets (as is currently done), exert back pressure on a data source providing packets to the initiator port, or perform a combination of the two actions.

The centralized credit manager resides on a fabric switch (or some other suitable device, system, or software application) positioned in a data path of a network and is accessible by each and every physical switch and virtual switch in the network.

In one embodiment, the centralized credit manager may be located within a gateway switch (which already enjoys the access to all other switches, virtual and physical). A network administrator may control the credit manager (distributed or centralized), enable policies for credit distribution, restrict certain ports, and/or enable certain ports to run at full line rate (maximum throughput at all times).

In addition, bandwidth slicing may be provided on one or more ports, such that if a higher data rate link is being shared by several lower data rate links, each of the lower data rate links may independently request flow credits from the target port. This approach requires pairs of flow credits or pairs of queue space to be established, to be available on the initiator port and the target port. This embodiment likely increases an amount of memory that is provided in hardware for network interface card (NIC) adapters and switches, but also provides significant benefits for flow management when utilized in conjunction with InfiniBand and RDMA type networks.

Flow credit exchange may be performed, in one embodiment, using data plane Ethernet packets. In other words, data plane Ethernet packets (having a standard or modified frame format recognizable by initiator and target ports) may be exchanged between ports in order to establish the existence of sufficient flow credits prior to sending the packet to the target port for servicing thereof. In an alternate embodiment, data center bridging (DCB) encryption control protocol (ECP) may be used to exchange flow credits, although this consumes more packets and bandwidth on the network.

In conventional systems, extended distance links may suffer from buffer credit starvation, since they have longer latency and effectively "store" packets in flight on the network. The initiator port may need to sit idle waiting for a response from the target port to renew its credits due to the longer link latency. In one embodiment, in order to address this issue, long distance links may be identified and indicated to the credit manager, and the credit manager may automatically apply a latency policy which gives more credits to these identified long distance links in order to compensate for the extended distance, according to one embodiment. In an alternate embodiment, the credit manager may be apprised of channel extension devices, such as wavelength division multiplexers (WDM) and other such devices known in the art, and these devices may be provided with special credit allocations for such long distance links.

In some embodiments, a separate data buffer may be provided for the long distance switch ports or WDM devices to store data frames until credits are received, enabling recovery if the link fails while packets are still in transit. Alternatively, speculative credits may be provided which allow the initiator port to send data packets without having sufficient flow credits, with the assumption that the acknowledgments of successfully delivered packets will be forthcoming, although the acknowledgements have not yet arrived. If the link is known to be reliable, this approach enables data to be continuously streamed on a long distance link without pausing for flow credit distribution back to the initiator port from the target port.

In another embodiment, a somewhat more complex fabric network may be provided, where incoming packets are classified at an incoming switch port, and the switch then requests flow credits from the credit manager for a specific traffic class of the packet. In other words, the switch may have credits for one specific priority, which relates to one traffic class, but the packet may be classified according to a different traffic class (having a different priority). The switch may not have sufficient flow credits in the traffic class of the incoming packet to transmit the packet to a target port. In one example of this situation, assume an incoming packet is classified as being in traffic class three, and the switch has flow credits for traffic class four, but no flow credits or insufficient flow credits for traffic class three. In one implementation, the switch would not be able to transmit the packet until sufficient traffic class three flow credits were obtained. In an alternate implementation, which would further complicate the fabric network, flow credit priority remapping may be supported in which the switch and the credit manager are capable of swapping one type of flow credit for another. Continuing the above example, in this situation, the switch could request a swap of its available traffic class four flow credits for an amount of traffic class three flow credits in order to transmit the packet. In one approach, flow credits may be swapped on a one-to-one basis. In another approach, the priority of the traffic class may be used to determine an uneven trade amount between each traffic class, depending on the difference in priority level represented by the flow credits being swapped. In this way, it is possible to send packets by reallocating available flow credits from a different traffic class.

In one such embodiment, a system may include an initiator port adapted to receive a traffic flow comprising a plurality of packets and a hardware processor and logic integrated with and/or executable by the processor. The logic is adapted to classify the traffic flow into a traffic class based on at least one criteria related to the traffic flow, the traffic class being selected from a plurality of traffic classes and transmit one or more packets of the traffic flow to a target port designated by the one or more packets of the traffic flow until an amount of flow credits allocated to the target port is insufficient to service additional packets.

Furthermore, in various embodiments, the logic may be further adapted to determine an amount of flow credits necessary to service the one or more packets of the traffic flow prior to transmitting the one or more packets of the traffic flow to the target port. In a further approach, the logic may be further adapted to, prior to transmitting the one or more packets of the traffic flow: send a first notification to the target port designated by the one or more packets, the first notification indicating an amount of flow credits necessary to service the one or more packets of the traffic flow, and receive a second indication from the target port, the second notification indicating an amount of flow credits available on the target port for servicing the one or more packets of the traffic flow.

In another further embodiment, the logic may be further adapted to, prior to transmitting the one or more packets of the traffic flow: reserve the necessary amount of flow credits on the target port to be exchanged with the initiator port when servicing the one or more packets of the traffic flow when the target port has the necessary amount of flow credits available for servicing the one or more packets of the traffic flow.

In one approach, the first and second indications may be exchanged via data plane Ethernet packets or some other suitable technique known in the art.

According to another embodiment, the at least one criteria related to the traffic flow is chosen from a group consisting of: a priority of the traffic flow, a VLAN identifier of at least one packet of the traffic flow, and a size of the one or more packets of the traffic flow, etc.

Furthermore, in some embodiments, a gateway switch may include the processor, the gateway switch being accessible by all physical switches and virtual switches in a network.

In another embodiment, an identifier indicating the traffic class of the one or more packets may be stored according to a VLAN identifier in a three bit VLAN tag portion of headers of the one or more packets.

In one implementation, the system may include a credit manager, the credit manager being adapted to distribute flow credits to all ports in the network according to a priority of each individual port. According to another embodiment, extended distances between the initiator and target ports are accounted for via at least one of: increasing an amount of flow credits that the credit manager allocates to the target port to be used in exchanges with the initiator port having an extended distance therebetween, and allowing an initiator port to transmit additional packets prior to receiving indication of successful delivery of prior transmitted packets in a speculative fashion, among other possible techniques.

According to one approach, the logic may be further adapted to request flow credits from a credit manager which correspond to the traffic class of the one or more packets of the traffic flow. In addition, in some approaches, the logic may be further adapted to request that the credit manager remap flow credits corresponding to a first traffic class to flow credits corresponding to a second traffic class.

A software-defined overlay network may have a common management framework for assignment of bandwidth to frame priorities, according to one embodiment. This software-defined overlay network may be implemented as an extension to any overlay network protocol, such as Distributed Overlay Virtual Ethernet (DOVE), VXLAN, NVGRE, etc., and may be used with existing virtualization platforms from any number of vendors, such as VMWare's ESX, IBM's PowerVM, KVM, Microsoft's Hyper-V, Xen, etc. The resulting virtualization platform virtual switch (vSwitch) allows data to be organized into priority groups (also referred to as "traffic classes"), each of which is assigned a priority group identification (ID), such as a number, an alphanumeric string, etc. The priority grouping is created by and stored within a switch traffic manager. Furthermore, in some approaches, the priority grouping does not require a special frame format in order to be recognized by devices which are capable of implementing traffic priority handling.

In one embodiment, eight priority levels may be used which coincide with a size of a VLAN tag already included in packet headers (3 bits are reserved for the VLAN tag, $2^3=8$ possible priority groups), implemented for each virtual port, e.g., on a per virtual port basis. This makes it possible to allocate different fractions of available link bandwidth to different traffic classes according to priority groupings. Some of the bandwidth on a switch physical layer may be allocated using other methods, while the remaining available bandwidth may be managed independently according to the embodiments disclosed herein.

According to one approach, traffic from different traffic classes may be provisioned for a specified or desired data rate, typically 10 Gbit/s, although any data rate may be used on a per switch, per port, or per traffic class basis. The bandwidth allocation quota may be implemented with a precision of around ±1%, provided that the processor hardware support for VM scheduling is available (such as from CPUs used by INTEL, IBM Power processors, etc.).

According to another embodiment, some fraction of the full link bandwidth may be reserved for lower priority traffic and may only be usable by lower priority traffic classes, in order to ensure that the full bandwidth of the link is not monopolized by higher priority traffic classes.

In a vSwitch, both Ethernet bandwidth allocation and computing or processing power allocation may be provided, as opposed to a physical switch where only bandwidth may be allocated. When a vSwitch receives packets, it identifies highest priority packets and responds to the receipt of the packets by allocating its processing resources according to the traffic priorities. In contrast, a physical switch using ETS allocates physical resources, such as buffer space and execution levels, but not processing resources.

A vSwitch does not have these resources, being implemented completely in software within a virtualization platform hosted by a server. Instead, the vSwitch achieves priority processing levels by assigning the highest priority packet processing to a higher priority task for processor thread execution, while a scheduler allocates available processor cycles accordingly. Thus, two levels of resource allocation are managed, one level is managed on the network bandwidth and the other resource is managed for vSwitch processor bandwidth.

Another embodiment allows for the ability to identify higher priority packets. These packets are recognized by a NIC driver of the server hosting the vSwitch. The NIC driver then informs an intermediate virtualization platform kernel of the higher packet priority, which in turn informs the vSwitch.

In addition, in some approaches, the number of priority groups is calculated in advance and network and processor bandwidth are assigned to these priority groups. For example, priority assignments may be different on a higher data rate NIC (100 Gbit/s or more) than on a lower data rate NIC, which is sharing different types of lower bandwidth traffic, or for applications such as Fiber Channel over Ethernet (FCoE) storage and/or Remote Direct Memory Access (RDMA) over Converged Ethernet (RoCE) clustering. When a higher priority packet arrives at the vSwitch, the virtualization platform kernel scheduler selects the process associated with that packet more often, and thus has enough processor bandwidth available for the higher priority task to execute.

Figure 6:
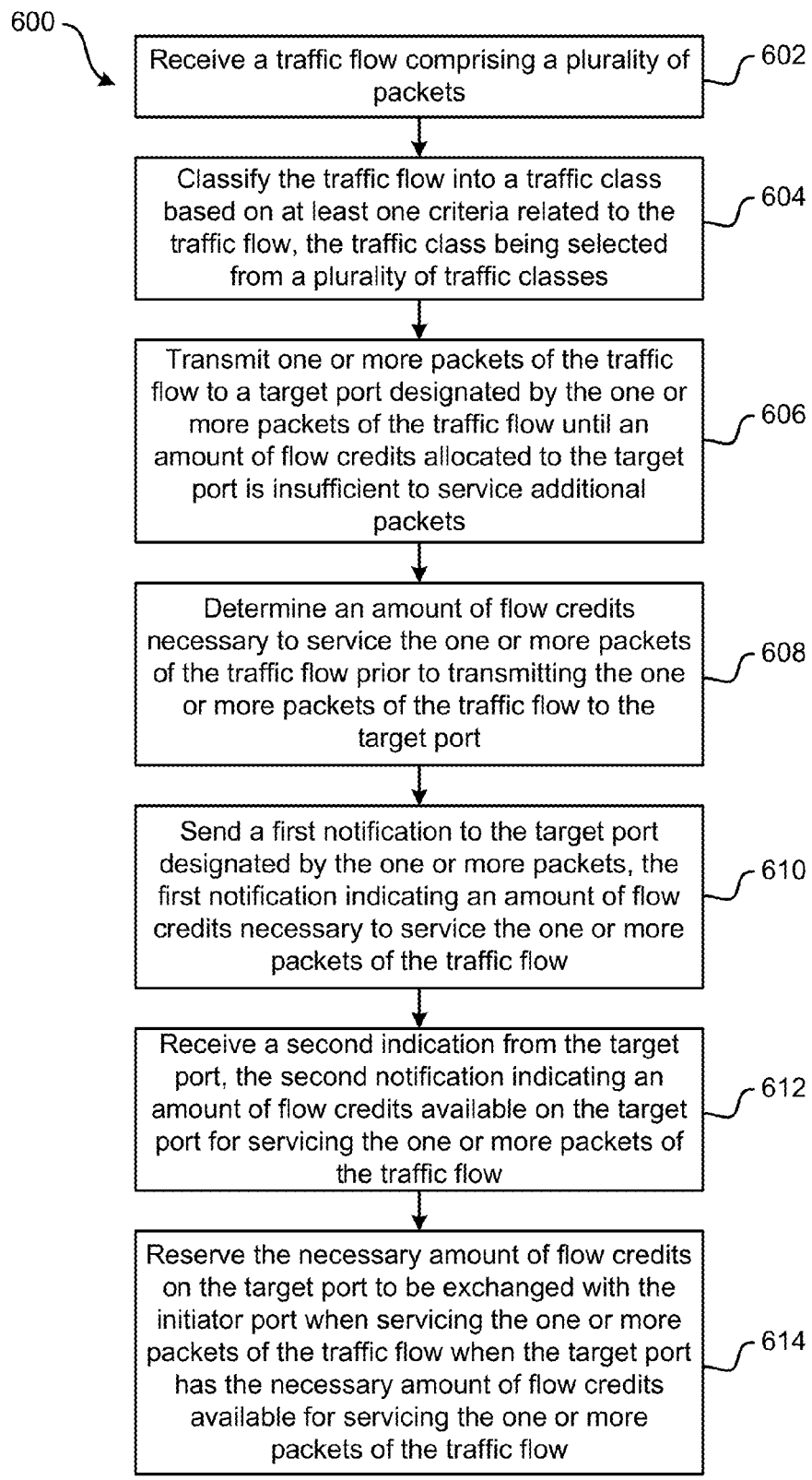
FIG. 6 shows a flowchart of a method according to one embodiment.

Now referring to FIG. 6, a flowchart of a method 600 for credit-based flow control is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a vSwitch hosted by a server, a server, a credit manager, a switch traffic controller, a processor (such as a CPU, an ASIC, an FPGA, etc.), a NIC, a virtualization platform, etc., or any other suitable device or component of a network system.

As shown in FIG. 6, method 600 may initiate with operation 602, where a traffic flow comprising a plurality of packets is received, such as by using an initiator port of a switch, either physical or virtual. Any number of packets may be included in the traffic flow, and each packet may have a header, payload, and other standard frame format features known in the art.

In operation 604, the traffic flow is classified into a traffic class based on at least one criteria related to the traffic flow, such as a size of the traffic flow, a priority of the traffic flow, a type of traffic flow, etc. The traffic class is selected from a plurality of traffic classes. In one embodiment, eight traffic classes are available with which to select from, each indicating a priority of the traffic flow and/or one or more packets therein.

In operation 606, one or more packets of the traffic flow are transmitted to a target port designated by the one or more packets of the traffic flow until an amount of flow credits allocated to the target port is insufficient to service additional packets. In this way, bandwidth allocation may be balanced and/or controlled across various ports in a network in an equitable manner.

In operation 608, an amount of flow credits necessary to service the one or more packets of the traffic flow are determined prior to transmitting the one or more packets of the traffic flow to the target port. In this way, the target port is capable of reserving the necessary flow credits to receive and service the one or more packets.

In operation 610, a first notification may be sent to the target port designated by the one or more packets, the first notification indicating an amount of flow credits necessary to service the one or more packets of the traffic flow. In this way, the target port is apprised of the amount of flow credits necessary to service the one or more packets.

In operation 612, a second indication may be received from the target port, the second notification indicating an amount of flow credits available on the target port for servicing the one or more packets of the traffic flow. In this way, the initiator port is informed whether the target port is capable of servicing the one or more packets of the traffic flow, and it may be determined whether to transmit the one or more packets to the target port, discard the one or more packets, or apply pressure to a source of the packets to slow the rate of receipt thereof.

In operation 614, the necessary amount of flow credits may be reserved on the target port to be exchanged with the initiator port when servicing the one or more packets of the traffic flow when the target port has the necessary amount of flow credits available for servicing the one or more packets of the traffic flow. According to one embodiment, the first and second indications may be exchanged via data plane Ethernet packets.

In another embodiment, the at least one criteria related to the traffic flow may be chosen from a group consisting of: a priority of the traffic flow, a VLAN identifier of at least one packet of the traffic flow, a size of the one or more packets of the traffic flow, etc.

According to another approach, a gateway switch may execute the method, the gateway switch being accessible by all physical switches and virtual switches in a network. Furthermore, an identifier indicating the traffic class of the one or more packets may be stored according to a VLAN identifier in a three bit VLAN tag portion of headers of the one or more packets, in one approach. In addition, in some approaches, flow credits may be distributed, using a credit manager, to all ports in the network according to a priority of each individual port.

In order to account for extended distances between the initiator and target ports, at least one of the following techniques is used: 1) an amount of flow credits that the credit manager allocates to the target port to be used in exchanges with the initiator port having an extended distance therebetween is increased so that there are more flow credits available for exchange between the target and initiator ports; and 2) an initiator port is allowed to transmit additional packets prior to receiving indication of successful delivery of prior transmitted packets in a speculative fashion, thereby allowing additional packets to be sent that would otherwise be delayed due to the distance between the ports.

In another embodiment, the method 600 may further include requesting flow credits from a credit manager which correspond to the traffic class of the one or more packets of the traffic flow and requesting that the credit manager remap flow credits corresponding to a first traffic class to flow credits corresponding to a second traffic class. In this way, the credit manager is allowed to remap flow credits on an individual basis when it is determined that it would ease congestion in the network or otherwise aid in packet transmission and bandwidth allocation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
at least one of:
 a hardware processor and hardware logic integrated with the hardware processor,
 the hardware processor and software logic stored in a memory executed by the hardware processor, or
 the hardware processor and firmware logic integrated with and executable by the hardware processor;
wherein the at least one of:
 the hardware processor and the hardware logic integrated with the hardware processor,
 the hardware processor and the software logic stored in the memory executed by the hardware processor, or
 the hardware processor and the firmware logic integrated with and executable by the hardware processor, being configured to:
  classify a traffic flow into a traffic class based on at least one criteria related to the traffic flow, the traffic class being selected from a plurality of traffic classes; and
  request that a credit manager remap flow credits corresponding to a first traffic class to flow credits corresponding to a second traffic class.

2. The system as recited in claim 1, wherein the logic is configured to:
 transmit one or more packets of the traffic flow to a target port designated by the one or more packets of the traffic flow until an amount of flow credits allocated to the target port is insufficient to service additional packets, the flow credits being allocated to the target port by the credit manager.

3. The system as recited in claim 2, wherein the logic is configured to:
 determine an amount of flow credits necessary to service the one or more packets of the traffic flow prior to transmitting the one or more packets of the traffic flow to the target port;
 send a first notification to the target port designated by the one or more packets, the first notification indicating an amount of flow credits necessary to service the one or more packets of the traffic flow;
 receive a second notification from the target port, the second notification indicating an amount of flow credits available on the target port for servicing the one or more packets of the traffic flow; and
 reserve the necessary amount of flow credits on the target port to be exchanged with an initiator port when servicing the one or more packets of the traffic flow when the target port has the necessary amount of flow credits available for servicing the one or more packets of the traffic flow,
wherein the first and second notifications are exchanged via data plane Ethernet packets.

4. The system as recited in claim 2, wherein an identifier indicating the traffic class of the one or more packets is stored according to a VLAN identifier in a three bit VLAN tag portion of headers of the one or more packets.

5. The system as recited in claim 2, wherein the logic is configured to request flow credits from the credit manager which correspond to the traffic class of the one or more packets of the traffic flow.

6. The system as recited in claim 2, wherein the logic is configured to account for extended distances between an initiator port and the target port by performing one or more actions selected from the group consisting of:
increasing an amount of flow credits that the credit manager allocates to the target port to be used in exchanges with the initiator port having an extended distance therebetween; and
allowing the initiator port to transmit additional packets prior to receiving indication of successful delivery of prior transmitted packets in a speculative fashion.

7. The system as recited in claim 1, wherein the system comprises a gateway switch that is accessible by all physical switches and virtual switches in a network.

8. The system as recited in claim 1, wherein the at least one criteria related to the traffic flow is chosen from a group consisting of: a priority of the traffic flow, a virtual local area network (VLAN) identifier of at least one packet of the traffic flow, and a size of the one or more packets of the traffic flow.

9. A computer program product for providing credit-based flow control, the computer program product comprising a computer readable storage device having program code embodied therewith, the embodied program code readable/executable by a processor to:
remap, using the processor, unused flow credits corresponding to a first traffic class to unused flow credits corresponding to a second traffic class in response to receiving a request from a switching device indicating that the second traffic class has insufficient flow credits to transmit a traffic flow.

10. The computer program product as recited in claim 9, wherein the embodied program code readable/executable by the processor is configured to:
allocate, using the processor, different fractions of available link bandwidth between an initiator port and a target port having different traffic classes according to priority groupings.

11. The computer program product as recited in claim 10, wherein the program code readable/executable by the processor is configured to:
determine, using the processor, an amount of flow credits necessary to service packets of the traffic flow prior to the packets of the traffic flow being transmitted to the target port; and
reserve, using the processor, the necessary amount of flow credits on the target port to be exchanged with the initiator port in response to a determination that the target port has the necessary amount of flow credits available for servicing the packets of the traffic flow.

12. The computer program product as recited in claim 11, wherein an identifier indicating the traffic class of the packets is stored according to a VLAN identifier in a three bit VLAN tag portion of headers of the packets.

13. The computer program product as recited in claim 10, wherein the embodied program code readable/executable by the processor is configured to:
receive, using the processor, a request for flow credits from the target port which correspond to the traffic class of packets of the traffic flow; and
reduce, using the processor, an amount of the unused flow credits corresponding to the first traffic class by a first amount corresponding to an amount of flow credits added to the unused flow credits corresponding to the second traffic class.

14. The computer program product as recited in claim 10, wherein the embodied program code readable/executable by the processor is configured to account, using the processor, for extended distances between an initiator port and the target port by performing one or more actions selected from the group consisting of:
increasing an amount of flow credits allocated to the target port to be used in exchanges with the initiator port having an extended distance therebetween; and
allowing the initiator port to transmit additional packets prior to receiving indication of successful delivery of prior transmitted packets in a speculative fashion.

15. A method for providing credit-based flow control, the method comprising:
classifying a traffic flow into a traffic class based on at least one criteria related to the traffic flow, the traffic class being selected from a plurality of traffic classes; and
storing an identifier indicating the traffic class of packets of the traffic flow according to a virtual local area network (VLAN) identifier in a three bit VLAN tag portion of a header of one or more of the packets.

16. The method as recited in claim 15, further comprising determining an amount of flow credits necessary to service the packets of the traffic flow prior to transmitting the packets of the traffic flow to a target port.

17. The method as recited in claim 15, further comprising transmitting the one or more packets of the traffic flow to a target port designated by the one or more packets of the traffic flow until an amount of flow credits allocated to the target port is insufficient to service additional packets.

18. The method as recited in claim 17, further comprising, prior to transmitting the one or more packets of the traffic flow:
sending a first notification to the target port designated by the one or more packets, the first notification indicating an amount of flow credits necessary to service the one or more packets of the traffic flow; and
receive a second notification from the target port, the second notification indicating an amount of flow credits available on the target port for servicing the one or more packets of the traffic flow.

19. The method as recited in claim 18, further comprising, prior to transmitting the one or more packets of the traffic flow:
reserving the necessary amount of flow credits on the target port to be exchanged with an initiator port when servicing the one or more packets of the traffic flow when the target port has the necessary amount of flow credits available for servicing the one or more packets of the traffic flow,
wherein the first and second notifications are exchanged via data plane Ethernet packets.

20. The method as recited in claim 15, wherein the at least one criteria related to the traffic flow is chosen from a group consisting of: a priority of the traffic flow, a virtual local area network (VLAN) identifier of at least one packet of the traffic flow, and a size of the one or more packets of the traffic flow.

* * * * *